(12) United States Patent
Erickson et al.

(10) Patent No.: US 10,335,952 B2
(45) Date of Patent: Jul. 2, 2019

(54) MONITORING AND CONTROLLING THE MOVEMENT OF MOBILE ROBOTS

(71) Applicant: INTERNATIONAL BUSINESS MACHINES CORPORATION, Armonk, NY (US)

(72) Inventors: Thomas D. Erickson, Minneapolis, MN (US); Ashish Kundu, Elmsford, NY (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 338 days.

(21) Appl. No.: 15/409,232

(22) Filed: Jan. 18, 2017

(65) Prior Publication Data
US 2018/0200891 A1    Jul. 19, 2018

(51) Int. Cl.
G05B 19/418 (2006.01)
B25J 9/16 (2006.01)
G05D 1/02 (2006.01)

(52) U.S. Cl.
CPC .......... *B25J 9/1697* (2013.01); *G05D 1/0214* (2013.01); *G05D 1/0297* (2013.01); *G05B 2219/40117* (2013.01); *G05D 2201/0216* (2013.01); *Y10S 901/01* (2013.01)

(58) Field of Classification Search
None
See application file for complete search history.

(56) References Cited

U.S. PATENT DOCUMENTS

| 5,758,298 A | 5/1998 | Guldner |
| 8,855,812 B2 | 10/2014 | Kapoor |
| 8,937,410 B2 | 1/2015 | Comins et al. |

FOREIGN PATENT DOCUMENTS

| CN | 101650568 | 12/2010 |
| CN | 202771260 | 3/2013 |

OTHER PUBLICATIONS

N. Mathews, et al., "Spatially Targeted Communication in Decentralized Multirobot Systems," Autonomous Robots, 38(4):439-457, Jan. 18, 2015.

(Continued)

*Primary Examiner* — Bhavesh V Amin
(74) *Attorney, Agent, or Firm* — F. Chau & Associates, LLC

(57) ABSTRACT

A computer-implemented method includes monitoring a current location of a mobile robot in a physical space, which includes a first area separated from a second area by a selectively permeable virtual membrane, and a software requirement corresponding to the mobile robot with regard to the second area. The method further includes identifying a software state of the mobile robot that matches the software requirement, determining whether the software state of the mobile robot meets the software requirement, and allowing the mobile robot to move from the first area to the second area through the selectively permeable virtual membrane in response to determining whether the software state of the mobile robot meets the software requirement.

20 Claims, 5 Drawing Sheets

(56) References Cited

OTHER PUBLICATIONS

N. Mathews et al., "Supervised Morphogenesis-Morphology Control of Ground-Based Self-Assembling Robots by Ariel Robots", Proceedings of the 11th International Conference on Autonomous Agents and Multiagent Systems (AAMAS 2012). Valencia, Spain. Jun. 2012. pp. 97-104.

N. Mathews, et al., "Spatially Targeted Communication and Self-Assembly" 2012 IEEE/RSJ International Conference on Intelligent Robots and Systems (IROS 2012) Oct. 7-12, 2012. Vilamoura, Algarve, Portugal, pp. 2678-2679.

MONITORING AND CONTROLLING THE MOVEMENT OF MOBILE ROBOTS

BACKGROUND

The present invention relates to mobile robots, and more specifically, to monitoring and controlling the movement of mobile robots in a physical space.

Mobile robots are not fixed to one physical location, and have the capability to move around in a physical environment. Autonomous mobile robots are capable of navigating an uncontrolled environment without the need for physical or electromechanical guidance devices. Non-autonomous mobile robots rely on guidance devices that allow them to travel a pre-defined navigation route in a relatively controlled space.

Mobile robots have become more commonplace in commercial and industrial settings. For example, hospitals use autonomous mobile robots to move materials, and warehouses use mobile robotic systems to efficiently move materials from stocking shelves to order fulfillment zones. Mobile robots are also being used in domestic and consumer applications, such as entertainment robots and robots that perform certain household tasks such as vacuuming.

SUMMARY

According to an exemplary embodiment of the present invention, a computer-implemented method includes monitoring a current location of a mobile robot in a physical space. The physical space includes a first area separated from a second area by a selectively permeable virtual membrane, and a software requirement corresponding to the mobile robot with regard to the second area. The method further includes identifying a software state of the mobile robot. The software state of the mobile robot matches the software requirement. The method further includes determining whether the software state of the mobile robot meets the software requirement, and allowing the mobile robot to move from the first area to the second area through the selectively permeable virtual membrane in response to determining whether the software state of the mobile robot meets the software requirement.

According to an exemplary embodiment of the present invention, a system includes a mobile robot, a tracking system that monitors a selectively permeable virtual membrane and a current location of the mobile robot in a physical space, a memory storing a computer program, and a processor that executes the computer program. The physical space includes a first area separated from a second area by the selectively permeable virtual membrane, and a software requirement corresponding to the mobile robot with regard to the second area. The computer program assigns the software requirement corresponding to the mobile robot to the second area, assigns the selectively permeable virtual membrane to a location in the physical space, and identifies a software state of the mobile robot. The software state of the mobile robot matches the software requirement. The computer program further determines whether the software state of the mobile robot meets the software requirement, and allows the mobile robot to move from the first area to the second area through the selectively permeable virtual membrane in response to determining whether the software state of the mobile robot meets the software requirement.

According to an exemplary embodiment of the present invention, a computer program product includes a computer readable storage medium having program instructions embodied therewith. The program instructions are executable by a processor to cause the processor to monitor a current location of a mobile robot in a physical space. The physical space includes a first area separated from a second area by a selectively permeable virtual membrane, and a software requirement corresponding to the mobile robot with regard to the second area. The program instructions are executable by the processor to further cause the processor to identify a software state of the mobile robot. The software state of the mobile robot matches the software requirement. The program instructions are executable by the processor to further cause the processor to determine whether the software state of the mobile robot meets the software requirement, and allow the mobile robot to move from the first area to the second area through the selectively permeable virtual membrane in response to determining whether the software state of the mobile robot meets the software requirement.

BRIEF DESCRIPTION OF THE DRAWINGS

The above and other features of the present invention will become more apparent by describing exemplary embodiments thereof in detail, with reference to the accompanying drawings, in which.

DETAILED DESCRIPTION

Figure 1:
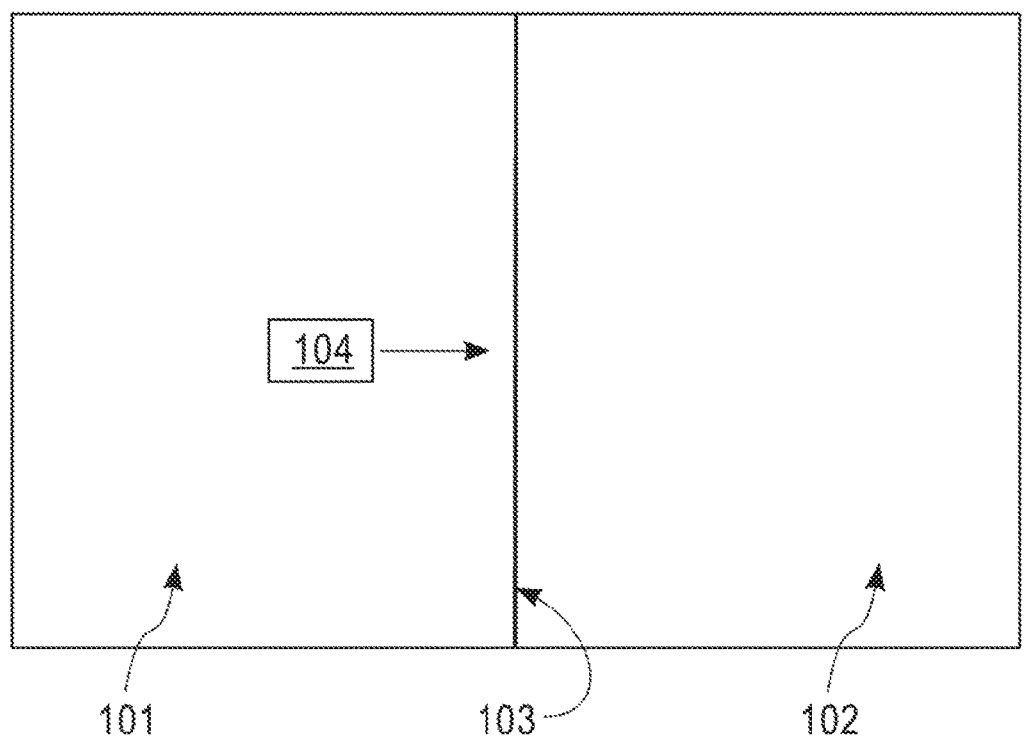
FIG. 1 illustrates an overview of a physical space according to an exemplary embodiment of the present invention.

Exemplary embodiments of the present invention will be described more fully hereinafter with reference to the accompanying drawings. Like reference numerals may refer to like elements throughout the specification and drawings.

FIG. 1 illustrates an overview of a physical space according to an exemplary embodiment of the present invention.

Referring now to FIG. 1, the physical space 100 includes a first area 101 and a second area 102. A selectively permeable virtual membrane 103 separates the first area 101 from the second area 102. The selectively permeable virtual membrane 103 is described further below. Although FIG. 1 illustrates two areas and one selectively permeable virtual membrane, exemplary embodiments of the present invention are not limited thereto. For example, in exemplary embodiments, a physical space may include three or more distinct areas and selectively permeable virtual membranes separating the distinct areas.

A mobile robot 104 is depicted as present in the physical space 100 of FIG. 1. The mobile robot 104 may be a mobile robot used in a variety of environments and may have a variety of functions. For example, the mobile robot 104 may be designed for use in a home, a factory, a hospital, a commercial setting such as a mall, etc. The mobile robot 104 may be, for example, a mobile vacuum cleaner or other type of mobile cleaning device, a drone (e.g., a flying drone or a ground drone), an android caregiver, etc. It is to be understood that these examples of the environment and function of the mobile robot 104 are exemplary, and the mobile robot 104 is not limited thereto. The mobile robot 104 may travel on the ground (e.g., via wheels, tracks, artificial legs, etc.), may fly through the air, or may travel through water, and may perform various tasks such as, for example, delivering and moving supplies.

As mobile robots have and will continue to become more advanced, they may increasingly make use of multiple on-board systems (also referred to herein as mobile robot subsystems). Different mobile robot subsystems may relate to various types of functionality including, for example, advanced vision features enabling learning, detection and tracking abilities, interaction with objects, colors, faces, motion, glyphs, or Quick Response (QR) codes. Further, different mobile robot subsystems may involve, for example, locomotion, navigation, flying, speech or gesture recognition, task specification and understanding, feedback loops, data filtering, control, pathfinding, and locating. The mobile robot subsystems may be updated, patched, enhanced, corrupted, or tampered with. As a result of such changes, the safe operation of mobile robots with respect to, for example, the features described above, may be interfered with.

For example, programming errors in the mobile robot 104, including but not limited to one or more mobile robot subsystems of the mobile robot 104, or mobile robot subsystems that have been corrupted or tampered with, may result in safety concerns relating to the mobile robot 104. For example, in an industrial setting, the power and/or size of industrial robots may result in the infliction of severe property damage and/or personal injury if programmed incorrectly or if tampered with. Due to the mass and high-speed of certain industrial robots, it may be dangerous for such robots to be within the vicinity of humans, especially in the event of programming errors and/or tampering.

Programming errors in one or more subsystems of a mobile robot may not be discovered until after the mobile robot has been produced and deployed into an environment. In such situations, software upgrades are typically performed on the one or more subsystems to correct the programming errors. By way of example only, there may be a situation in which version 1.0 of the software of a subsystem of a mobile robot presents a safety concern, and in which version 1.5 of a software patch has been applied to address the safety concern.

Referring again to FIG. 1, it may be desirable to determine whether one or more of the mobile robot's 104 subsystems is up-to-date before allowing the mobile robot 104 to proceed to a certain area. For example, the mobile robot 104 may currently be located in the first area 101, and may attempt to move into the second area 102, as indicated by the arrow in FIG. 1. In an exemplary scenario, the first area 101 is an area in which humans are typically not present, and the second area 102 is an area in which humans are present. According to exemplary embodiments of the present invention, the mobile robot 104 may be prohibited from moving from the first area 101 to the second area 102 until it has been verified that the software version of one or more of the mobile robot's 104 subsystems is up-to-date, and/or that the software has not been tampered with. This is accomplished in exemplary embodiments using the selectively permeable virtual membrane 103.

The selectively permeable virtual membrane 103 is a virtual boundary that separates different areas from one another, and that takes into account software versions of one or more subsystems of the mobile robot 104 when determining whether to allow the mobile robot 104 to pass through the membrane 103 from one area to another. For example, the selectively permeable virtual membrane 103 refers to a boundary region of space (e.g. in an exemplary scenario, 20 to 23 feet away from a sensitive piece of machinery). Thus, when it is detected (e.g., by a tracking system, as described further below) that the mobile robot 104 is, for example, 22 feet away from the sensitive piece of machinery, a signal may be sent to the mobile robot 104 prohibiting the mobile robot 104 from traveling any closer to the sensitive piece of machinery until the mobile robot's 104 software version is upgraded. The selectively permeable virtual membrane 103 may also be referred to herein as a semipermeable membrane, a partially permeable membrane, or a differentially permeable membrane.

The selectively permeable virtual membrane 103 defines a boundary between areas, and is used to control the movement of the mobile robot 104 between the areas. For example, a monitoring system according to exemplary embodiments of the present invention monitors the position of the mobile robot 104 relative to the selectively permeable virtual membrane 103, and in response, controls the movement and operation of the mobile robot 104, as described further below. The general functionality of the selectively permeable virtual membrane 103 may be described as being similar to that of a semipermeable biological membrane. For example, in the context of a semipermeable biological membrane, the membrane allows certain molecules or ions to pass through it by diffusion and occasionally specialized facilitated diffusion, along with other types of passive transport and active transport. The mobile robot 104 traverses the selectively permeable virtual membrane 103 based on a similar principle. For example, similar to how certain molecules are permitted to pass through a semipermeable biological membrane based on properties of the molecules, certain mobile robots 104 are permitted to pass through the selectively permeable virtual membrane 103 based on properties of the mobile robots 104 (e.g., software versions or software states of the mobile robots).

Figure 2:
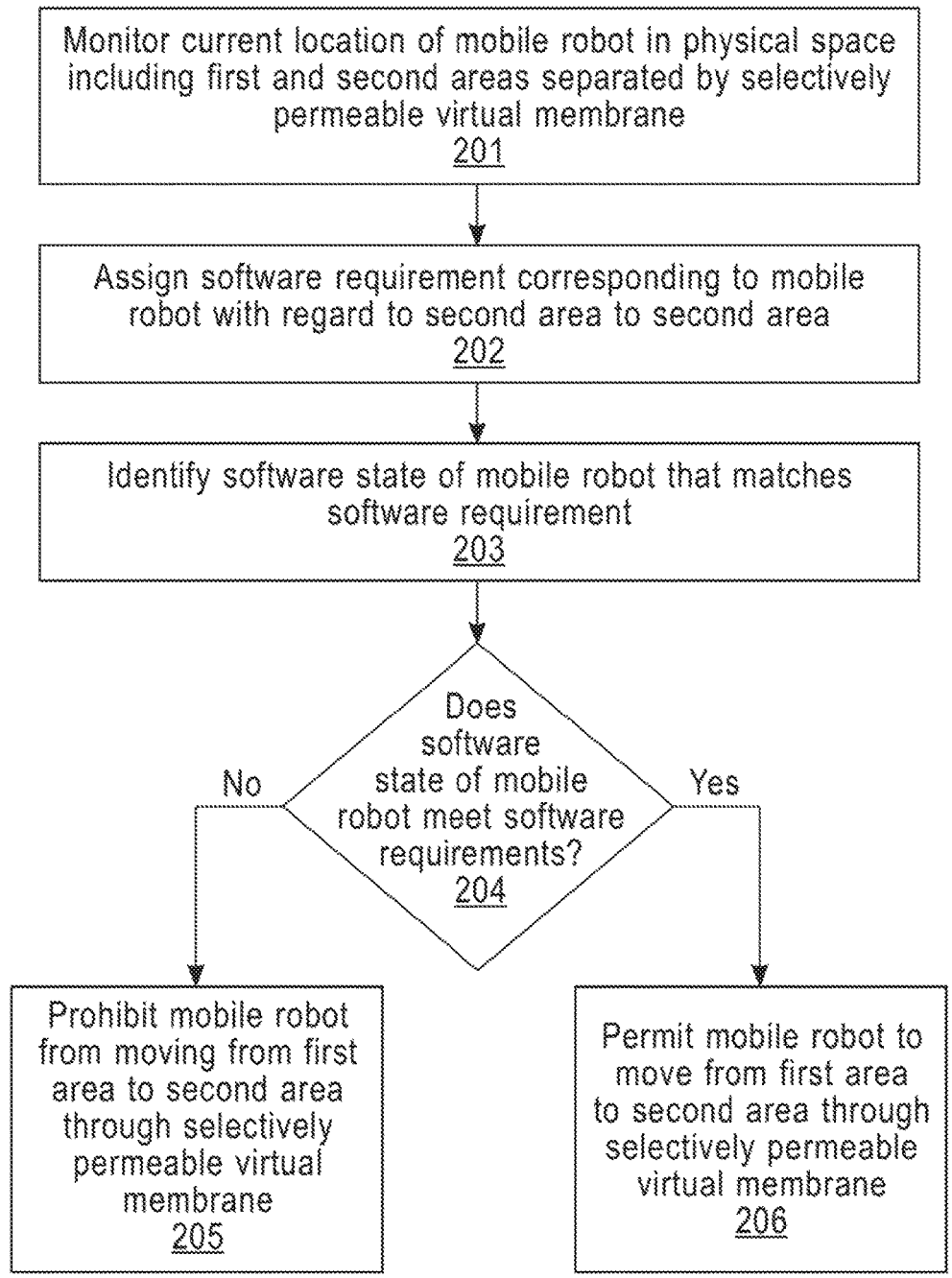
FIG. 2 is a flowchart illustrating a method according to an exemplary embodiment of the present invention.

FIG. 2 is a flowchart illustrating a method according to an exemplary embodiment of the present invention.

Referring now to FIG. 2, at block 201, a current location of the mobile robot 104 in the physical space 100 is monitored. The current location of the mobile robot 104 may be monitored using a variety of tracking systems including, for example, the tracking system 302 described further below with reference to FIG. 3. For example, in an exemplary embodiment, the tracking system may include at least one camera mounted in or near the physical space 100 such that the physical space 100 is within the field of view of the camera. The at least one camera may visually track the mobile robot 104 within the physical space 100 to determine whether the mobile robot 104 is approaching or is near the selectively permeable virtual membrane 103. Other types of electronic tracking systems may also be utilized to monitor the current location of the mobile robot 104. For example, the tracking system may be an indoor positioning system (IPS) that locates the mobile robot 104 inside a building using radio waves, magnetic fields, acoustic signals, etc. The tracking system may utilize methods that involve distance measurements to nearby anchor nodes (e.g., nodes with known positions, such as WiFi access points). In exemplary embodiments, the tracking system may use existing Wi-Fi equipment serving, for example, airports, factory floors, offices, or other buildings. For example, SpotFi technology may be used to generate GPS-style maps for indoor spaces. SpotFi is a refinement of other existing Wi-Fi location methods in which a device uses the signal strength from different Wi-Fi access points as an indication of how far away the access points are. The device can then use this data to triangulate its own position. Accuracy may be improved using algorithms that ignore signals that have bounced, and that estimate the angle at which incoming signals from an access point are arriving, allowing for more accurate triangulation.

At block 202, a software requirement corresponding to the mobile robot 104 with regard to the second area 102 is assigned to the second area 102. According to exemplary embodiments, the software requirement may correspond to a software version requirement of a mobile robot subsystem type, or a subsystem installation requirement. These exemplary embodiments are described in further detail below.

At block 203, a software state of the mobile robot 104 that matches the software requirement is identified. According to exemplary embodiments, the software state may correspond to a software version of a subsystem already installed on the mobile robot 104 that matches the mobile robot subsystem type (e.g., when the software requirement corresponds to a software version requirement of a mobile robot subsystem type), or a subsystem installation state of the mobile robot 104 with regard to a subsystem that matches the subsystem installation requirement (e.g., when the software requirement corresponds to the subsystem installation requirement). These exemplary embodiments are described in further detail below.

At block 204, it is determined whether the software state of the mobile robot 104 meets the software requirement.

At block 205, if it is determined that the software state of the mobile robot 104 does not meet the software requirement, the mobile robot 104 is prohibited from moving from the first area 101 to the second area 102 through the selectively permeable virtual membrane 103. That is, the mobile robot 104 is prohibited from moving from the first area 101 to the second area 102 through the selectively permeable virtual membrane 103 in response to determining that the software state of the mobile robot does not meet the software requirement.

Alternatively, at block 206, if it is determined that the software state of the mobile robot 104 meets the software requirement, the mobile robot 104 is permitted to move from the first area 101 to the second area 102 through the selectively permeable virtual membrane 103. That is, the mobile robot 104 is allowed to move from the first area 101 to the second area 102 through the selectively permeable virtual membrane 103 in response to determining that the software state of the mobile robot 104 meets the software requirement.

Referring again to block 205, the mobile robot 104 may be prohibited from moving from the first area 101 to the second area 102 in a variety of manners. For example, in an exemplary embodiment, a physical barrier may be deployed between the first area 101 and the second area 102 at a physical location corresponding to the selectively permeable virtual membrane 103. The physical barrier may be deployed under the control of a computer (e.g., the computer control system 301 described with reference to FIG. 3). For example, the physical barrier may be a mechanical door or fence having a network transceiver that is in communication with the computer control system 301 (e.g., via a wired or wireless connection) that is open/closed or lowered/raised under the control of the computer. In an exemplary embodiment, rather than employing a physical barrier, an intercept alert signal may be transmitted (e.g., wirelessly transmitted) to a mobile robot 104 (referred to herein as an intercepting mobile robot 104) in the vicinity of another mobile robot 104 that is to be prohibited from moving from the first area 101 to the second area 102. The intercept alert signal may be transmitted from the computer to the intercepting mobile robot 104. The intercepting mobile robot 104 may physically prevent the other mobile robot (e.g., by blocking its path, restraining it, etc.) from moving from the first area 101 into the second area 102.

Software Requirement Corresponds to Software Version Requirement of Mobile Robot Subsystem Type, and Software State Corresponds to Software Version of Subsystem Installed on Mobile Robot that Matches Mobile Robot Subsystem Type As described above with reference to FIG. 2, in an exemplary embodiment of the present invention, the software requirement corresponds to a software version requirement of a mobile robot subsystem type, and the software state of the mobile robot 104 corresponds to a software version of a subsystem installed on the mobile robot 104 that matches the mobile robot subsystem type.

In an exemplary embodiment, a map of the physical space 100 may be created and used by a user (e.g., with knowledge of the physical space 100 and of requirements relating to different areas within the physical space 100) to assign different software version requirements to different areas within the physical space 100. The map creation and assignment may be performed using, for example, a computer (e.g., the computer control system 301 described with reference to FIG. 3). The mobile robot subsystem type refers to different types of software subsystems installed on the mobile robot 104. For example, the mobile robot 104 may include various subsystem types such as a motion subsystem that controls movement of the mobile robot 104, a recognition subsystem that controls cameras and sensors of the mobile robot 104, and a control subsystem that controls the overall operation of the mobile robot 104. It is to be understood that the subsystem types described herein are exemplary, and that exemplary embodiments of the present invention are not limited thereto.

Consider an exemplary scenario in which a region of a factory floor near sensitive equipment is easily disturbed by noise, vibration, or possible collisions with the mobile robot 104. In this case, navigational software with improved collision-avoidance functionality may be desired to be installed on the mobile robot 104 before the mobile robot 104 enters the region. Similarly, consider another exemplary scenario in which a region of a factory floor is noisy, and in which workers communicate with the mobile robot 104 via voice commands and gestures. In this case, software with improved speech or gesture recognition may be desired to be installed on the mobile robot 104 before the mobile robot 104 enters this region. A software version requirement may be assigned to these regions to enforce these requirements.

Consider another exemplary scenario in which the mobile robot 104 includes a motion subsystem having software version 1.0, the first area 101 of the physical space 100 is an area in which humans are not typically present, and the second area 102 is an area in which humans are typically present. At some point after the mobile robot 104 has been deployed into the physical space 100, it may be determined that there is an error in software version 1.0 of the motion subsystem that renders the mobile robot 104 unsafe within the vicinity of humans (e.g., the mobile robot 104 may increase speed or change direction unexpectedly due to a software error). In this case, the software controlling the motion subsystem may be upgraded to version 1.1, in which the error causing the safety concern has been corrected. In this scenario, a software version requirement of version 1.1 with relation to the motion subsystem type may be assigned to the second area 102. As a result, any mobile robot that does not have version 1.1 of the motion subsystem will not be permitted to pass through the selectively permeable virtual membrane 103 into the second area 102. Thus, the selectively permeable virtual membrane 103 enforces the software version requirement assigned to the second area 102.

The software version of a subsystem of a mobile robot 104 may be identified, for example, by wirelessly transmitting a software version identification request to the mobile robot 104. The software version identification request may be transmitted from, for example, a computer (e.g., the computer control system 301 described with reference to FIG. 3). In exemplary embodiments, the computer may be located remote from the mobile robot 104. In response to receiving the software version identification request, the mobile robot 104 may in turn wirelessly transmit a message to the computer indicating the software version of the subsystem.

Referring again to FIG. 2 and to the exemplary scenario described above in which the mobile robot 104 includes a motion subsystem having software version 1.0, at block 202, a software version requirement corresponding to the mobile robot 104 with regard to the second area 102 is assigned to the second area 102 for the motion subsystem which requires version 1.1 of the motion subsystem to be installed on the mobile robot 104 before the mobile robot 104 is permitted to enter the second area 102. The software version of the motion subsystem of the mobile robot 104 is identified at block 203. According to exemplary embodiments, the software version may be identified as the mobile robot 104 moves closer to the second area 102, or the software version may be identified periodically (e.g., at predefined time intervals).

At block 204, it is determined whether the motion subsystem of the mobile robot 104 is at least version 1.1. This determination may be made, for example, by retrieving the version number of the mobile robot's 104 subsystem and comparing the retrieved version number to the software version requirement.

At block 205, if the software version of the mobile robot's 104 motion subsystem is less than version 1.1, the mobile robot 104 is prohibited from passing through the selectively permeable virtual membrane 103 into the second area 102. Alternatively, at block 206, if the software version of the mobile robot's 104 motion subsystem is at least equal to version 1.1, the mobile robot 104 is permitted to pass through the selectively permeable virtual membrane 103 into the second area 102.

In exemplary embodiments, in response to determining that the software version of the mobile robot's 104 subsystem does not meet the software version requirement of the second area 102 at block 204, a software upgrade of the subsystem may be initiated. For example, the software of the mobile robot's 104 subsystem may be upgraded in response to determining that the software version of the subsystem does not meet the software version requirement. Once the software upgrade has been completed, the mobile robot 104 may be permitted to move from the first area 101 to the second area 102 through the selectively permeable virtual membrane 103.

The software of the mobile robot's 104 subsystem may be upgraded in a variety of manners. For example, the software upgrade may be wirelessly transmitted to the mobile robot 104. In an exemplary embodiment, the software upgrade may be wirelessly transmitted from a computer (e.g., the computer control system 301 described with reference to FIG. 3) to the mobile robot 104. The computer may be located at the same location as the mobile robot 104 or at a location remote from the mobile robot 104. In an exemplary embodiment, the mobile robot 104 may be in wireless communication with other mobile robots 104 within the physical space 100, and the software upgrade may be wirelessly transmitted from the other mobile robot(s) 104 to the mobile robot 104. The software upgrade transmitted from one mobile robot 104 to another mobile robot 104 may be initiated by the computer, or by the mobile robot 104 transmitting the software upgrade. For example, in an exemplary embodiment, a mobile robot 104 that has a software version higher than that of other mobile robots 104 may automatically upgrade the other mobile robots 104 when the other mobile robots 104 are in the vicinity of the mobile robot 104 with the higher software version.

In some scenarios, it may be desirable that the software upgrade of a mobile robot 104 be temporary. Thus, the mobile robot's 104 subsystem may be downgraded in response to the mobile robot 104 moving back to the first area 101 from the second area 102 through the selectively permeable virtual membrane 103. The software downgrade process may downgrade the mobile robot's 104 subsystem to its previous state before the mobile robot 104 moved from the first area 101 to the second area 102 through the selectively permeable virtual membrane 103 (e.g., from version 1.1 back to version 1.0 in the exemplary scenario described above).

Software Requirement Corresponds to Subsystem Installation Requirement, and Software State Corresponds to Subsystem Installation State of Mobile Robot with Regard to Subsystem that Matches Subsystem Installation Requirement As described above, in an exemplary embodiment of the present invention, the software requirement corresponds to a subsystem installation requirement, and the software state of the mobile robot 104 corresponds to a subsystem installation state of the mobile robot 104 with regard to a subsystem that matches the subsystem installation requirement. In this exemplary embodiment, rather than permitting/prohibiting the mobile robot 104 from moving to the first area 101 to the second area 102 based on whether a software version requirement of a subsystem already installed on the mobile robot 104 is met, as described above, the mobile robot 104 is permitted/prohibited from moving to the first area 101 to the second area 102 based on whether a particular subsystem is installed on the mobile robot 104.

In an exemplary embodiment, a map of the physical space 100 may be created and used by a user (e.g., with knowledge of the physical space 100 and of requirements relating to different areas within the physical space 100) to assign different subsystem installation requirements to different areas within the physical space 100. The map creation and assignment may be performed using, for example, a computer (e.g., the computer system 301 described with reference to FIG. 3). Different subsystems of the mobile robot 104 may perform different functions. In exemplary embodiments, it may be required that all mobile robots 104 entering the second area 102 from the first area 101 through the selectively permeable virtual membrane 103 have a particular subsystem installed that is capable of performing a particular function. The selectively permeable virtual membrane 103 may enforce the subsystem installation requirements.

Consider an exemplary scenario in which a subsystem installation requirement is assigned to the second area 102 requiring that all mobile robots 104 that enter the second area 102 have a collision avoidance subsystem installed before the mobile robots 104 are permitted to enter the second area 102. The subsystem installation state of a mobile robot 104 in this exemplary scenario indicates whether the collision avoidance subsystem is installed on the mobile robot 104.

The subsystem installation state of a mobile robot 104 with regard to a subsystem that matches the subsystem installation requirement may be identified, for example, by wirelessly transmitting a subsystem installation identification request to the mobile robot 104. The subsystem installation identification request may be transmitted from, for example, a computer (e.g., the computer control system 301 described with reference to FIG. 3). In exemplary embodiments, the computer may be at the same location as the mobile robot 104 or located remote from the mobile robot 104. In response to receiving the subsystem installation requirement request, the mobile robot 104 may in turn wirelessly transmit a message to the computer indicating the subsystem installation state of the mobile robot 104 (e.g., indicating whether the subsystem matching the subsystem installation requirement is installed on the mobile robot 104).

Referring again to FIG. 2 and to the exemplary scenario described above in which a subsystem installation requirement is assigned to the second area 102 requiring that all mobile robots 104 that enter the second area 102 have a collision avoidance subsystem installed, at block 202, a subsystem installation requirement corresponding to the mobile robot 104 with regard to the second area 102 is assigned to the second area 102 for the collision avoidance subsystem which requires that the collision avoidance subsystem be installed on the mobile robot 104 before the mobile robot 104 is permitted to enter the second area 102. The subsystem installation state of the mobile robot 104 with regard to the collision avoidance subsystem is identified at block 203. The subsystem installation state in this exemplary scenario indicates whether the collision avoidance subsystem is installed on the mobile robot 104. According to exemplary embodiments, the subsystem installation state may be identified as the mobile robot 104 moves closer to the second area 102, or the subsystem installation state may be identified periodically (e.g., at predefined time intervals).

At block 204, it is determined whether the subsystem installation state of the mobile robot 104 meets the subsystem installation requirement. For example, in the present exemplary scenario, it is determined whether the collision avoidance subsystem is installed on the mobile robot 104.

At block 205, if the collision avoidance subsystem is not installed on the mobile robot 104, the mobile robot 104 is prohibited from passing through the selectively permeable virtual membrane 103 into the second area 102. Alternatively, at block 206, if the collision avoidance subsystem is installed on the mobile robot 104, the mobile robot 104 is permitted to pass through the selectively permeable virtual membrane 103 into the second area 102.

Referring again to block 204, in an exemplary embodiment, in response to determining that the subsystem indicated by the subsystem installation requirement is not installed on the mobile robot 104, the subsystem may be installed on the mobile robot 104, and the mobile robot 104 may then be permitted to move from the first area 101 to the second area 102 through the selectively permeable virtual membrane 103 upon completion of the subsystem installation. The subsystem may be installed on the mobile robot 104 in a similar manner as the software upgrade process described above. Further, in an exemplary embodiment, after the subsystem is installed on the mobile robot 104 to permit the mobile robot 104 to move from the first area 101 to the second area 102 through the selectively permeable virtual membrane 103, the subsystem may subsequently be uninstalled from the mobile robot 104 in response to the mobile robot 104 moving back to the first 101 area from the second area 102 through the selectively permeable virtual membrane 103. This uninstallation process may be performed in a similar manner as the subsystem downgrade process described above.

In an exemplary embodiment, an antivirus scan operation may be performed on the subsystem indicated by the subsystem installation requirement in response to determining that the subsystem is installed on the mobile robot 104. In this exemplary embodiment, the mobile robot 104 may be permitted to move from the first area 101 to the second area 102 through the selectively permeable virtual membrane 103 in response to the antivirus scan operation indicating that the subsystem installed on the mobile robot 104 does not include a software virus. Alternatively, if the antivirus scan operation indicates that a software virus is included in the mobile robot's 104 subsystem, the software virus may be removed from the subsystem, and upon removal of the software virus, the mobile robot 104 may then be permitted to move from the first area 101 to the second area 102 through the selectively permeable virtual membrane 103.

Figure 3:
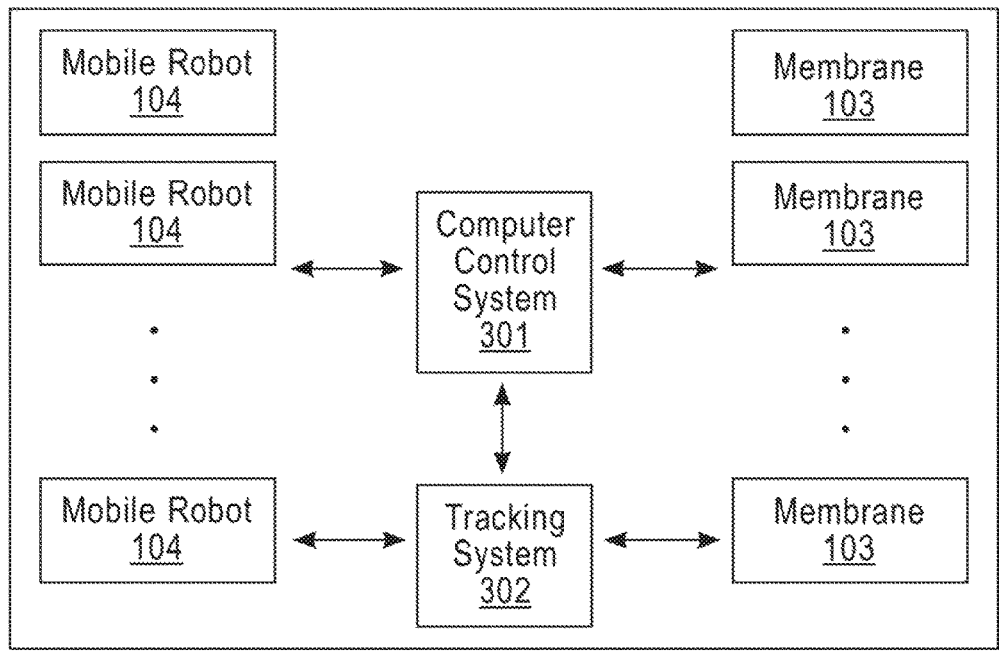
FIG. 3 is a block diagram illustrating a system according to an exemplary embodiment of the present invention.

FIG. 3 is a block diagram illustrating a system according to an exemplary embodiment of the present invention.

As shown in FIG. 3, a system according to an exemplary embodiment of the present invention includes a computer control system 301, a tracking system 302, at least one mobile robot 104, and at least one selectively permeable virtual membrane 103. The computer control system 301 may be utilized to implement the methods of monitoring and controlling movement of mobile robots 104 as described herein. The computer control system 301 may be, for example, the computer system 601 described below with reference to FIG. 6. The computer control system 301 may be in communication with the at least one mobile robot 104, the at least one selectively permeable virtual membrane 103, and the tracking system 302. For example, the computer control system 301, the at least one mobile robot 104, the at least one selectively permeable virtual membrane 103, and the tracking system 302 may included wired and/or wireless transceivers that facilitate communication with one another. Wireless communication between the devices may be encrypted. The computer control system 301 may be located at the same location as the at least one mobile robot 104 or at a remote location from the at least one mobile robot 104.

Referring to FIGS. 1-3 and 6, according to an exemplary embodiment of the present invention, a system includes the mobile robot 104, the tracking system 302, a memory storing a computer program, and a processor that executes the computer program. The memory and the processor may respectively be the memory 603 and the central processing unit (CPU) 602 described with reference to FIG. 6. The tracking system 302 may monitor the selectively permeable virtual membrane 103 and a current location of the mobile robot 104. The computer program may assign the software requirement corresponding to the mobile robot 104 to the second area 102, assign the selectively permeable virtual membrane 103 to a location in the physical space 100, identify a software state of the mobile robot 104 that matches the software requirement, determine whether the software state of the mobile robot 104 meets the software requirement, and allow the mobile robot 104 to move from the first area 101 to the second area 102 through the selectively permeable virtual membrane 103 in response to determining whether the software state of the mobile robot 104 meets the software requirement.

According to an exemplary embodiment of the present invention, mobile robots 104 in proximity of one another may share software (e.g., subsystem versions/upgrades and subsystems) in a peer-to-peer manner. This sharing approach may be used, for example, when mobile robots 104 are working in collaboration to perform a task. In exemplary embodiments, mobile robots 104 traveling near each other may automatically upload software to their neighbors. Noise tolerant time-varying factor graphs may be used to monitor and predict actions of mobile robots 104 within a network, and to encourage software upgrades within the network. The network of mobile robots 104 may be defined by, for example, proximity, a collaboration group, mobile robots 104 having a similar type or purpose, etc. In exemplary embodiments, incentives may be offered to ensure that all mobile robots 104 are up-to-date with the most recent software upgrades, and mobile robots 104 that do not have the most recent software upgrades may be discouraged from being involved in certain tasks.

Figure 4:
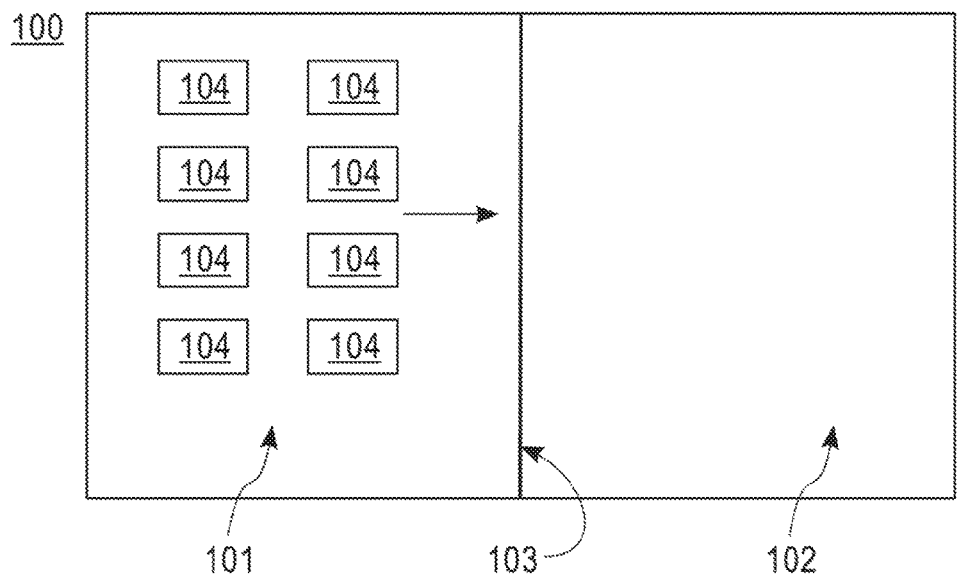
FIG. 4 illustrates an overview of a physical space according to another exemplary embodiment of the present invention.
Figure 5:
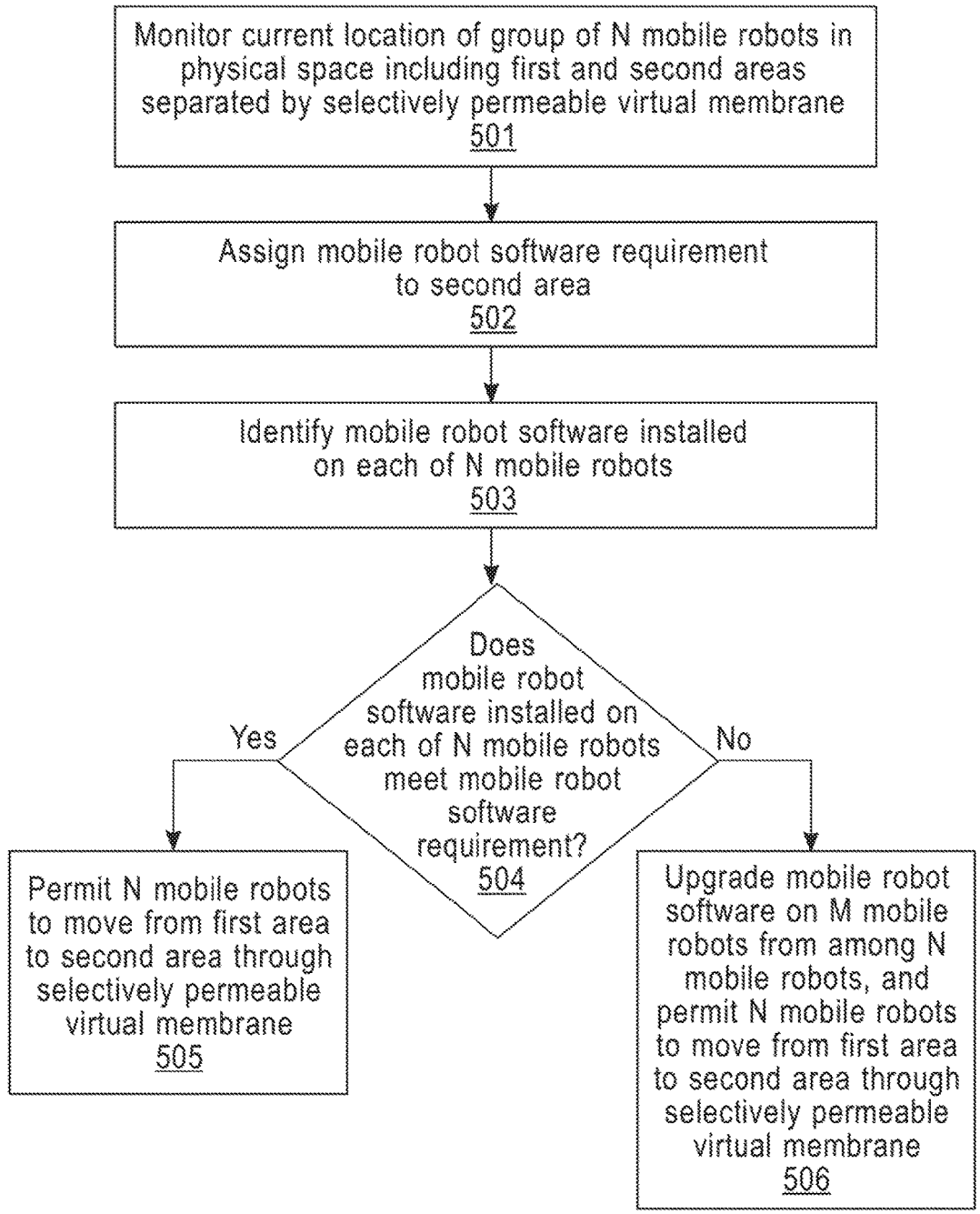
FIG. 5 is a flowchart illustrating a method according to another exemplary embodiment of the present invention.

FIG. 4 illustrates an overview of a physical space according to another exemplary embodiment of the present invention. FIG. 5 is a flowchart illustrating a method according to another exemplary embodiment of the present invention. For convenience of explanation, a further description of processes and components previously described may not be repeated here.

Referring now to FIGS. 4 and 5, at block 501, a current location of a group of N mobile robots 104 within the physical space 100 is monitored (N is an integer greater than or equal to 2). The physical space 100 includes the first area 101 separated from the second area 102 by the selectively permeable virtual membrane 103.

At block 502, a mobile robot software requirement is assigned to the second area 102. The mobile robot software requirement may be the software version requirement or the subsystem installation requirement described above.

At block 503, mobile robot software installed on each of the N mobile robots 104 is identified. The mobile robot software may refer to the software version of a subsystem installed the mobile robots 104 or a subsystem installation state of the mobile robots 104.

At block 504, it is determined whether the mobile robot software installed on each of the N mobile robots 104 meets the mobile robot software requirement.

Referring to block 505, the N mobile robots 104 are permitted to move from the first area 101 to the second area 102 through the selectively permeable virtual membrane 103 in response to determining that the mobile robot software installed on each of the N mobile robots 104 meets the mobile robot software requirement.

Alternatively, referring to block 506, the mobile robot software installed on M mobile robots 104 from among the N mobile robots 104 is upgraded in response to determining that the mobile robot software installed on each of the M mobile robots 104 does not meet the mobile robot software requirement (M is an integer greater than 0 and less than N). That is, when the N mobile robots 104 are approaching the selectively permeable virtual membrane 103, if M out of the N mobile robots 104 do not meet the mobile robot software requirement, automatic upgrading of the M mobile robots 104 that do not meet the mobile software requirement may be automatically triggered. Upon completion of the software upgrade, the N mobile robots 104 (which includes the M mobile robots 104) may be permitted to move from the first area 101 to the second area 102 through the selectively permeable virtual membrane 103. The M mobile robots 104 may receive the software upgrade from a remote computer (e.g., the computer control system 301 described with reference to FIG. 3), server, or cloud, or in a peer-to-peer manner (e.g., the M mobile robots 104 may receive the mobile robot software upgrade from mobile robots 104 included in the N mobile robots 104 other than the M mobile robots 104). In exemplary embodiments, the N mobile robots 104 may pause together and wait until all of the N mobile robots 104 meet the mobile robot software requirement, or until a certain percentage of the N mobile robots 104 meets the mobile robot software requirement, before proceeding toward (and through) the selectively permeable virtual membrane 103.

According to exemplary embodiments, the availability and coverage of the communication network used by the mobile robot 104 to communicate with the computer (e.g., the computer control system 301 described with reference to FIG. 3) may be taken into account. For example, certain software may be pre-installed on the mobile robot 104 before the mobile robot 104 reaches its destination area if it is known that there is poor network coverage in the destination area. In exemplary embodiments, a plurality of mobile robots 104 may incrementally receive software upgrades without disrupting the functionality and/or movement of the mobile robots 104. A priority queue may be utilized to upgrade mobile robots 104 in exemplary embodiment.

As described above, in exemplary embodiments, after upgrading software of a mobile robot's 104 subsystem to permit the mobile robot 104 to move from the first area 101 to the second area 102 through the selectively permeable virtual membrane 103, the software may subsequently be downgraded upon the mobile robot 104 moving back to the first area 101 from the second area 102 through the selectively permeable virtual membrane 103. Similarly, after installing a software subsystem on a mobile robot 104 to permit the mobile robot to move from the first area 101 to the second area 102 through the selectively permeable virtual membrane 103, the software subsystem may subsequently be uninstalled from the mobile robot 104 upon the mobile robot 104 moving back to the first area 101 from the second area 102 through the selectively permeable virtual membrane 103. These downgrading and uninstalling processes may be performed for a variety of reasons.

In an exemplary scenario, a mobile robot 104 may be rented or leased to an entity from a third party supplier. The third party supplier may develop its own software subsystems and install these subsystems on the mobile robot 104. For example, the third party supplier may develop a software subsystem directed at performing a particular task within a particular environment, for example, for the third party's own use. The third party may wish to maintain control over such software subsystems by having them installed only when the mobile robot 104 enters a certain area (e.g., the third party's premises), and uninstalling them when the mobile robot 104 leaves a certain area (e.g., the third party's premises). The third party may also wish to replace generic software components (e.g., a standard navigation software subsystem) with its own functionally identical copy of the component which the third party knows is free of viruses, spyware, malware, etc. The third party may also, for example, install software components on the mobile robot 104 that will protect the privacy of humans within the third party's premises (e.g., in the case of mobile robots 104 that assist healthcare providers), or that comply with local regulations or laws. Such software components may be installed/uninstalled as described above, as well as via, for example, the third party's private cloud. Herein, the terms software component and mobile robot subsystem may be used interchangeably.

In exemplary embodiments, templates, which may be created and/or edited by a user or a business (e.g., such as the third party described above), may be used to control various (e.g., traversal) characteristics of the mobile robot(s) 104. Effective template characteristics may be learned for different contexts.

In exemplary embodiments, the impact of not upgrading software on the mobile robot 104 may be assessed (e.g., the likelihood of mission failure, safety risk, etc.), and the impact may be used as a factor in determining software upgrade requirements associated with the selectively permeable virtual membrane 103.

The mobile robot 104 may have limited storage space. According to exemplary embodiments of the present invention, certain software components (e.g., certain software subsystems) that are not needed in a particular area may be temporarily removed when the mobile robot 104 enters this area to make room for another software subsystem that is needed in this area. For example, referring again to FIG. 1, a mobile robot 104 located in the first area 101 may have an advanced navigation subsystem preinstalled. In an exemplary scenario, the advanced navigation subsystem is not needed in the second area 102, and an advanced vision subsystem is required for all mobile robots 104 entering the second area 102. In this scenario, the mobile robot 104 traveling through the selectively permeable virtual membrane 103 from the first area 101 to the second area 102 may trigger an operation causing the advanced navigation subsystem to be uninstalled from the mobile robot 104 to free up storage space for installation of the advanced vision subsystem. Upon moving back to the first area 101 from the second area 102 through the selectively permeable virtual membrane 103, an operation may be triggered causing the advanced vision subsystem to be uninstalled from the mobile robot 104 to free up storage space for reinstallation of the advanced navigation subsystem. Uninstalled software subsystems may be temporarily stored, for example, in a remote storage area (e.g., storage space included on the computer control system 301 described with reference to FIG. 3 or another computer, a cloud storage system, etc.), or an another mobile robot 104, until they are reinstalled on the mobile robot 104 from which they were uninstalled from. Storage of the mobile robot 104 may be optimized based on anticipating and learning tasks that the mobile robot 104 will likely execute.

Exemplary embodiments of the present invention may be utilized in a variety of exemplary scenarios. For example, a mobile robot 104 entering a factory space may be required to have secure software. In this exemplary scenario, old software may be wiped when the mobile robot 104 enters the factory space, the old software may be replaced with known secure software, and the old software may be restored when the mobile robot 104 leaves the factory space. In an exemplary scenario, software installed on a mobile robot 104 may be customized to a factory's needs. In an exemplary scenario, a factory may wish to ensure that all mobile robots 104 are using the most recent version of a software component. In an exemplary scenario, a factory may wish to ensure that all mobile robots have identical versions of a software component (e.g., it may be desirable that mobile robots 104 have an identical version of a software component when the mobile robots 104 are collaborating to perform a task). In an exemplary scenario, a standard version of a software component may require network access, and network access may not be permitted in a certain environment. In this scenario, a different version of the standard software component that does not require network access may replace the standard version. In an exemplary scenario, a mobile robot 104 performing a cleaning task in a high-security area may be monitored to ensure that the mobile robot 104 does not take anything out of the high-security area, including information (e.g., if the mobile robot 104 has generated a map of the high-security area while performing its tasks, the map may be erased using the selectively permeable virtual membrane 103 before the mobile robot leaves the high-security area). In an exemplary scenario, a leased telepresence mobile robot 104 operating at a conference may be required to have software components that recognize a specified set of languages, have a conference-specific map of an area (e.g., since different conferences may be held at different convention centers at which the telepresence mobile robot 104 must navigate), or follow certain rules of etiquette depending on the nature of the participants of the conference.

As described above, according to exemplary embodiments of the present invention, the mobile robot 104 may be an autonomous vehicle. In exemplary scenarios, the autonomous vehicle may be required to load a particular set of instructions or other software components to drive on a particular section of a road (e.g., under certain conditions, such as during inclement weather or at night), or to be allowed entry to a particular region with distinct customs, regulations, laws, etc. Exemplary embodiments of the present invention may be utilized in these scenarios to ensure that the autonomous vehicle has the required set of instructions or software components.

Figure 6:
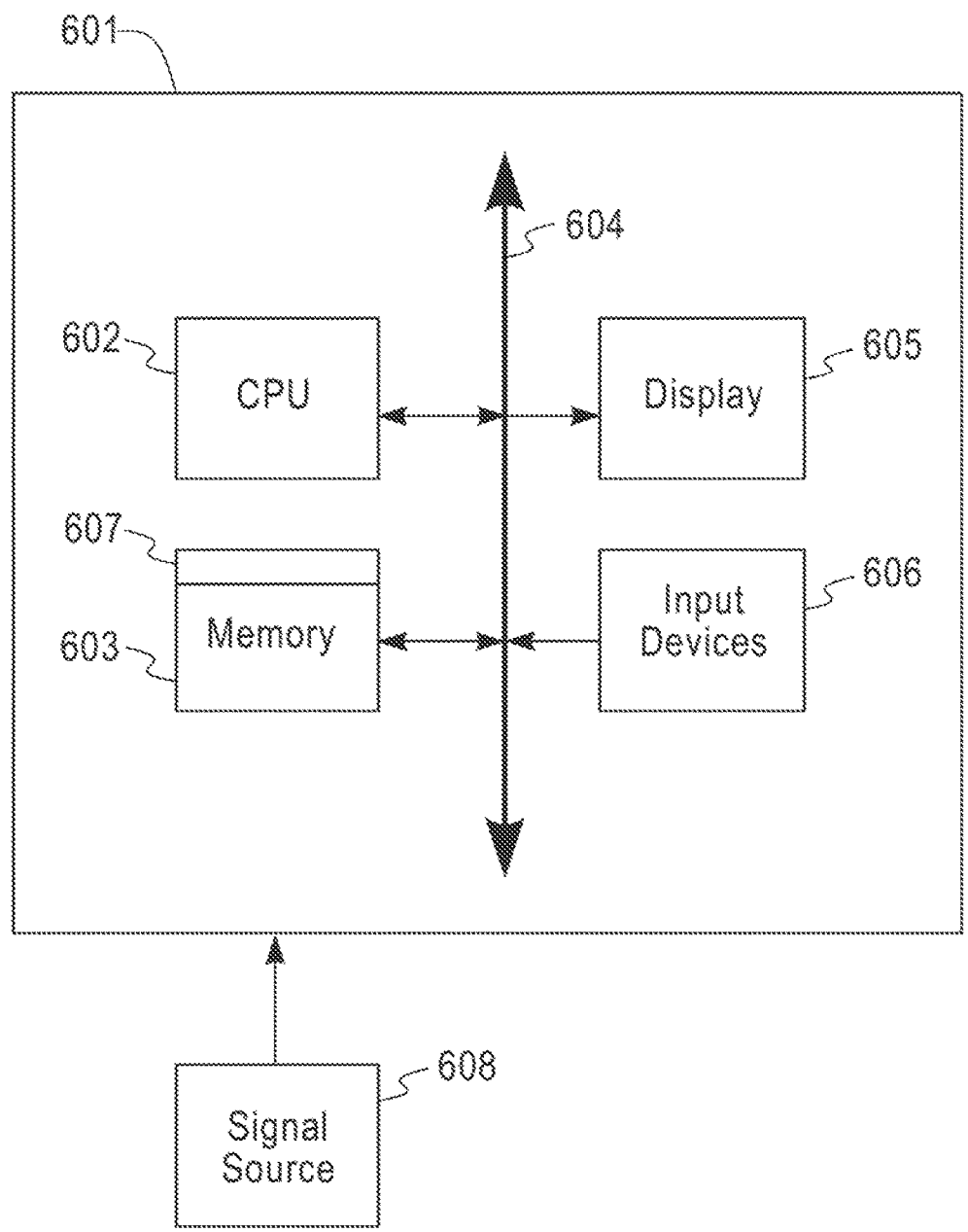
FIG. 6 illustrates an example of a computer system according to an exemplary embodiment of the present invention.

FIG. 6 illustrates an example of a computer system according to an exemplary embodiment of the present invention.

Exemplary embodiments of the present invention may be implemented in various forms of hardware, software, firmware, special purpose processors, or a combination thereof. For example, exemplary embodiments of the present invention may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet. In an exemplary embodiment, a method of monitoring and controlling the movement of mobile robots may be implemented in software as an application program tangibly embodied on a computer readable storage medium or computer program product. As such the application program is embodied on a non-transitory tangible media. The application program may be uploaded to, and executed by, a processor comprising any suitable architecture.

Referring now to FIG. 6, according to an exemplary embodiment of the present invention, a computer system 601 for monitoring and controlling the movement of mobile robots can include, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general-purpose computer system that becomes a specific purpose computer system when executing the routine 607 of the present invention.

The computer platform 601 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modification and variations will be apparent by those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    monitoring a current location of a mobile robot in a physical space, wherein the physical space comprises a first area separated from a second area by a selectively permeable virtual membrane, and a software requirement corresponding to the mobile robot with regard to the second area;
    identifying a software state of the mobile robot, wherein the software state of the mobile robot matches the software requirement;
    determining whether the software state of the mobile robot meets the software requirement; and
    allowing the mobile robot to move from the first area to the second area through the selectively permeable virtual membrane in response to said determining whether the software state of the mobile robot meets the software requirement.

2. The computer-implemented method of claim 1, wherein said determining whether the software state of the mobile robot meets the software requirement further comprises:
    determining that the software state of the mobile robot meets the software requirement; and
    permitting the mobile robot to move from the first area to the second area through the selectively permeable virtual membrane in response to said determining that the software state of the mobile robot meets the software requirement.

3. The computer-implemented method of claim 1, wherein said determining whether the software state of the mobile robot meets the software requirement further comprises:
    determining that the software state of the mobile robot does not meet the software requirement; and
    prohibiting the mobile robot from moving from the first area to the second area through the selectively permeable virtual membrane in response to said determining that the software state of the mobile robot does not meet the software requirement.

4. The computer-implemented method of claim 3, wherein said prohibiting the mobile robot from moving from the first area to the second area through the selectively permeable virtual membrane comprises:
    deploying a physical barrier between the first area and the second area at a physical location in the physical space corresponding to the selectively permeable virtual membrane.

5. The computer-implemented method of claim 3, wherein said prohibiting the mobile robot from moving from the first area to the second area through the selectively permeable virtual membrane comprises:
    wirelessly transmitting an intercept alert to another mobile robot located in the physical space, wherein the intercept alert causes the another mobile robot to physically prevent the mobile robot from moving into the second area.

6. The computer-implemented method of claim 1, wherein the software requirement corresponding to the mobile robot with regard to the second area corresponds to a software version requirement of a mobile robot subsystem type, and the software state of the mobile robot corresponds to a software version of a subsystem installed on the mobile robot that matches the mobile robot subsystem type.

7. The computer-implemented method of claim 6, wherein said determining whether the software state of the mobile robot meets the software requirement further comprises:
    determining that the software version of the subsystem installed on the mobile robot does not meet the software version requirement;
    upgrading software of the subsystem installed on the mobile robot in response to said determining that the software version of the subsystem installed on the mobile robot does not meet the software version requirement; and
    permitting the mobile robot to move from the first area to the second area through the selectively permeable virtual membrane upon completion of said upgrading the software of the subsystem installed on the mobile robot.

8. The computer-implemented method of claim 7, wherein said upgrading the software of the subsystem installed on the mobile robot further comprises:
    wirelessly transmitting a software upgrade to the mobile robot from a computer disposed at a location remote from the mobile robot.

9. The computer-implemented method of claim 7, wherein said upgrading the software of the subsystem installed on the mobile robot further comprises:
    wirelessly transmitting the software upgrade to the mobile robot from another mobile robot located in the physical space.

10. The computer-implemented method of claim 7, further comprising:

downgrading the software of the subsystem installed on the mobile robot in response to the mobile robot moving back to the first area from the second area through the selectively permeable virtual membrane,
wherein the software of the subsystem installed on the mobile robot is downgraded to its previous state before the mobile robot moved from the first area to the second area through the selectively permeable virtual membrane.

11. The computer-implemented method of claim 6, wherein said identifying the software state of the mobile robot further comprises:
wirelessly transmitting a software version identification request to the mobile robot from a computer; and
wirelessly receiving a message at the computer indicating the software version of the subsystem installed on the mobile robot, wherein the message is transmitted by the mobile robot in response to the software version identification request.

12. The computer-implemented method of claim 1, wherein the software requirement corresponding to the mobile robot with regard to the second area corresponds to a subsystem installation requirement, and the software state of the mobile robot corresponds to a subsystem installation state of the mobile robot with regard to a subsystem that matches the subsystem installation requirement.

13. The computer-implemented method of claim 12, wherein said determining whether the software state of the mobile robot meets the software requirement further comprises:
determining that the subsystem that matches the subsystem installation requirement is not installed on the mobile robot;
installing the subsystem that matches the subsystem installation requirement on the mobile robot in response to said determining that the subsystem that matches the subsystem installation requirement is not installed on the mobile robot; and
permitting the mobile robot to move from the first area to the second area through the selectively permeable virtual membrane upon completion of said installing the subsystem that matches the subsystem installation requirement on the mobile robot.

14. The computer-implemented method of claim 1, wherein the mobile robot is one of a group of N mobile robots, and the method further comprises:
monitoring a current location of the group of N mobile robots within the physical space, wherein N is an integer greater than or equal to 2;
identifying mobile robot software installed on each of the N mobile robots;
determining whether the mobile robot software installed on each of the N mobile robots meets the software requirement;
allowing the N mobile robots to move from the first area to the second area through the selectively permeable virtual membrane in response to determining that the mobile robot software installed on each of the N mobile robots meets the software requirement;
upgrading the mobile robot software installed on M mobile robots from among the N mobile robots in response to determining that the mobile robot software installed on each of the M mobile robots does not meet the software requirement, wherein M is an integer greater than 0 and less than N; and
allowing the N mobile robots to move from the first area to the second area through the selectively permeable virtual membrane in response to determining that the mobile robot software installed on each of the N mobile robots does not meet the software requirement, and in response to upgrading the mobile robot software installed on the M mobile robots.

15. The computer-implemented method of claim 14, wherein the M mobile robots receive the mobile robot software upgrade from mobile robots included in the N mobile robots other than the M mobile robots.

16. A system, comprising:
a mobile robot;
a tracking system that monitors a selectively permeable virtual membrane and a current location of the mobile robot in a physical space, wherein the physical space comprises a first area separated from a second area by the selectively permeable virtual membrane, and a software requirement corresponding to the mobile robot with regard to the second area;
a memory storing a computer program; and
a processor that executes the computer program, wherein the computer program:
assigns the software requirement corresponding to the mobile robot to the second area;
assigns the selectively permeable virtual membrane to a location in the physical space;
identifies a software state of the mobile robot, wherein the software state of the mobile robot matches the software requirement;
determines whether the software state of the mobile robot meets the software requirement; and
allows the mobile robot to move from the first area to the second area through the selectively permeable virtual membrane in response to determining whether the software state of the mobile robot meets the software requirement.

17. The system of claim 16, further comprising:
a physical barrier disposed at the location corresponding to the selectively permeable virtual membrane,
wherein the computer program:
determines that the software state of the mobile robot does not meet the software requirement; and
prohibits the mobile robot from moving from the first area to the second area through the selectively permeable virtual membrane by deploying the physical barrier in response to determining that the software state of the mobile robot does not meet the software requirement.

18. The system of claim 16, wherein the tracking system comprises:
at least one camera that visually tracks the current location of the mobile robot relative to the selectively permeable virtual membrane, wherein the physical space is within a field of view of the at least one camera.

19. The system of claim 16, wherein the mobile robot is an autonomous vehicle.

20. A computer program product comprising a computer readable storage medium having program instructions embodied therewith, the program instructions executable by a processor to cause the processor to:
monitor a current location of a mobile robot in a physical space, wherein the physical space comprises a first area separated from a second area by a selectively permeable virtual membrane, and a software requirement corresponding to the mobile robot with regard to the second area;

identify a software state of the mobile robot, wherein the software state of the mobile robot matches the software requirement;
determine whether the software state of the mobile robot meets the software requirement; and
allow the mobile robot to move from the first area to the second area through the selectively permeable virtual membrane in response to said determining whether the software state of the mobile robot meets the software requirement.

* * * * *